United States Patent
Cocchi et al.

(10) Patent No.: US 6,745,593 B2
(45) Date of Patent: Jun. 8, 2004

(54) DEVICE FOR SUPPORTING DISPOSABLE CONTAINERS OF LIQUID ICE CREAM MIX IN THE CHAMBER OF ICE CREAM MAKING MACHINES

(75) Inventors: Gino Cocchi, Bologna (IT); Gianni Zaniboni, Borgonuovo Di Sasso Marconi (IT)

(73) Assignee: Ali S.p.A.-Carpigiani Group (IT)

( * ) Notice: Subject to any disclaimer, the term of this patent is extended or adjusted under 35 U.S.C. 154(b) by 0 days.

(21) Appl. No.: 10/452,151

(22) Filed: Jun. 3, 2003

(65) Prior Publication Data

US 2004/0003620 A1 Jan. 8, 2004

(30) Foreign Application Priority Data

Jul. 5, 2002 (IT) ................................. GE20020010 U

(51) Int. Cl.[7] ................................................ A23G 9/08
(52) U.S. Cl. ........................................................ 62/342
(58) Field of Search .................................. 62/342, 343

(56) References Cited

U.S. PATENT DOCUMENTS

| | | | | | |
|---|---|---|---|---|---|
| 3,141,573 A | * | 7/1964 | Patch et al. | ............... | 222/129.1 |
| 3,660,988 A | * | 5/1972 | Garavelli | ...................... | 62/306 |
| 3,797,268 A | * | 3/1974 | Garavelli | ...................... | 62/258 |
| 3,989,492 A | * | 11/1976 | Keyes | .......................... | 62/136 |
| 4,201,558 A | * | 5/1980 | Schwitters et al. | ............ | 62/70 |
| 4,522,041 A | * | 6/1985 | Menzel | ........................ | 62/342 |

\* cited by examiner

*Primary Examiner*—William E. Tapolcai
(74) *Attorney, Agent, or Firm*—Stites & Harbison PLLC; Marvin Petry

(57) ABSTRACT

Device for supporting and handling containers of liquid ice cream mix in ice cream making machines of the type in which the liquid ice cream mix is contained in special disposable containers which, after having been connected to a feeder tube equipped with a perforating spike, are turned upside down and placed in a refrigerated chamber in the body of the machine. Said device comprises a basket of an essentially cage-like structure open at the front and provided at the bottom and top with supporting surfaces, the said cage-like structure pivoting in the center of its flanks on the flanks of the chamber of the said machine.

6 Claims, 3 Drawing Sheets

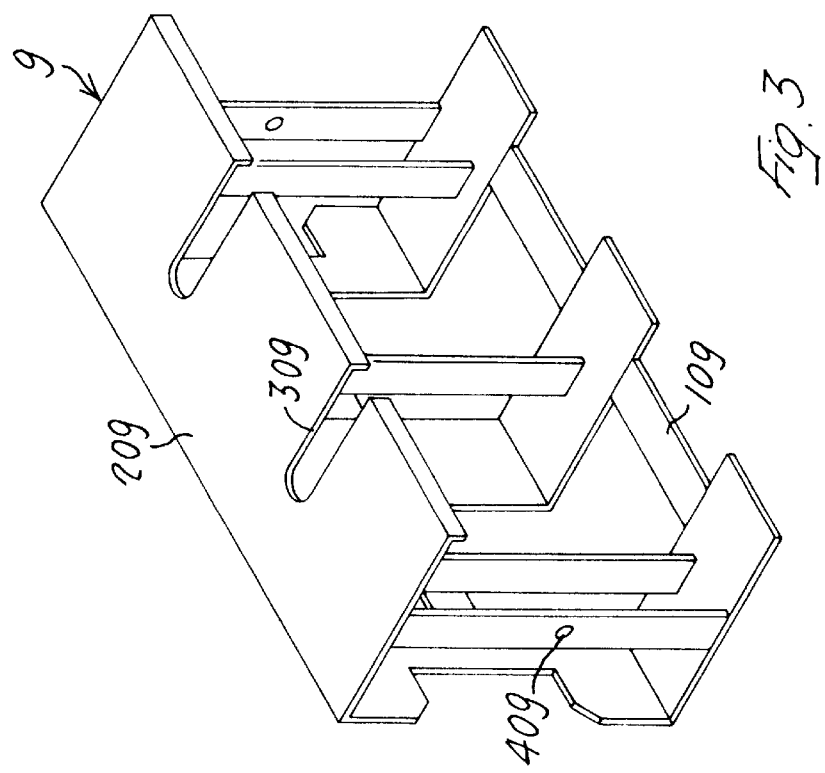
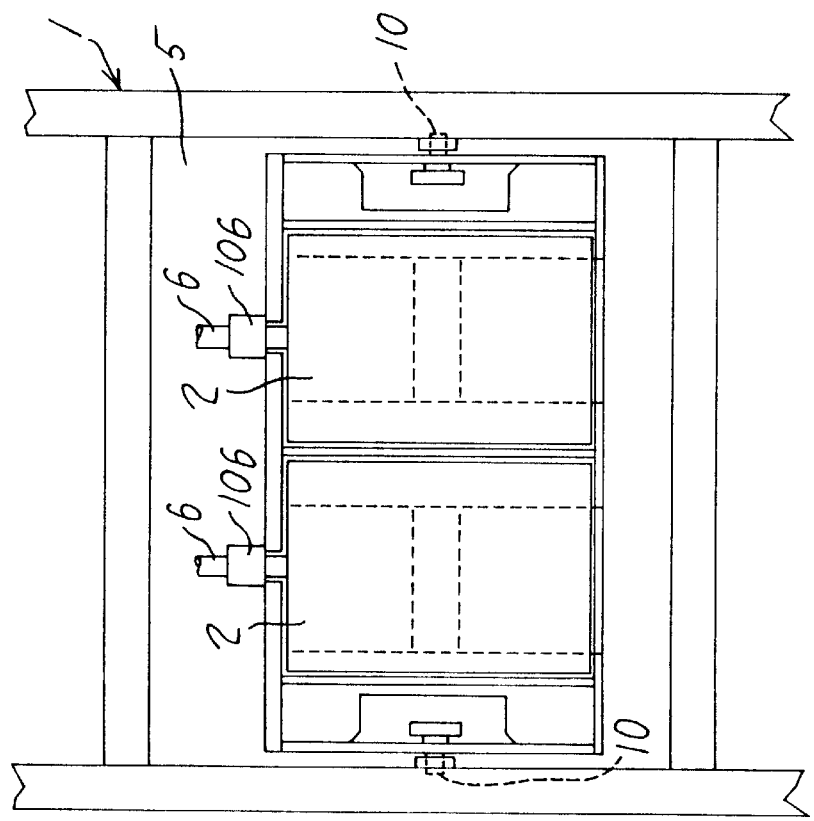

DEVICE FOR SUPPORTING DISPOSABLE CONTAINERS OF LIQUID ICE CREAM MIX IN THE CHAMBER OF ICE CREAM MAKING MACHINES

BACKGROUND AND SUMMARY OF THE INVENTION

The present invention relates to ice cream making machines of the type in which the liquid ice cream mix is contained in special disposable containers which, after having been connected to a feeder tube equipped with a perforating spike, are placed upside down, in order to assist and/or ensure complete emptying thereof, in a refrigerated chamber in the body of the machine.

Difficulties can occur in the operation of inserting these containers upside down into the chamber of the machine: during this operation it is possible that the feeder tube may come out, or that it may be pushed too far into the container (which consists of a plastic bag enclosed inside a cardboard box), so deforming it, etc.

It is therefore an object of the present invention to provide a device capable of facilitating the operation of insertion (and also of extraction) of the said containers into and from the refrigerated chamber of the said machines.

It is a further object of the present invention to provide a device of the abovementioned type capable of being mounted as an accessory in the refrigerated chambers of existing machines.

BRIEF DESCRIPTION OF THE DRAWINGS

Other objects and advantages of the device according to the invention will become clearer in the course of the following detailed description of a preferred embodiment thereof, reference being made to the appended drawings, in which:

FIG. 2 is a front view of the detail of the refrigerated chamber of the machine shown in FIG. 1, with the basket device according to the invention in position;

FIG. 3 is a perspective view of the basket device according to the invention.

DESCRIPTION OF THE PREFERRED EMBODIMENT OF THE INVENTION

Figure 1:
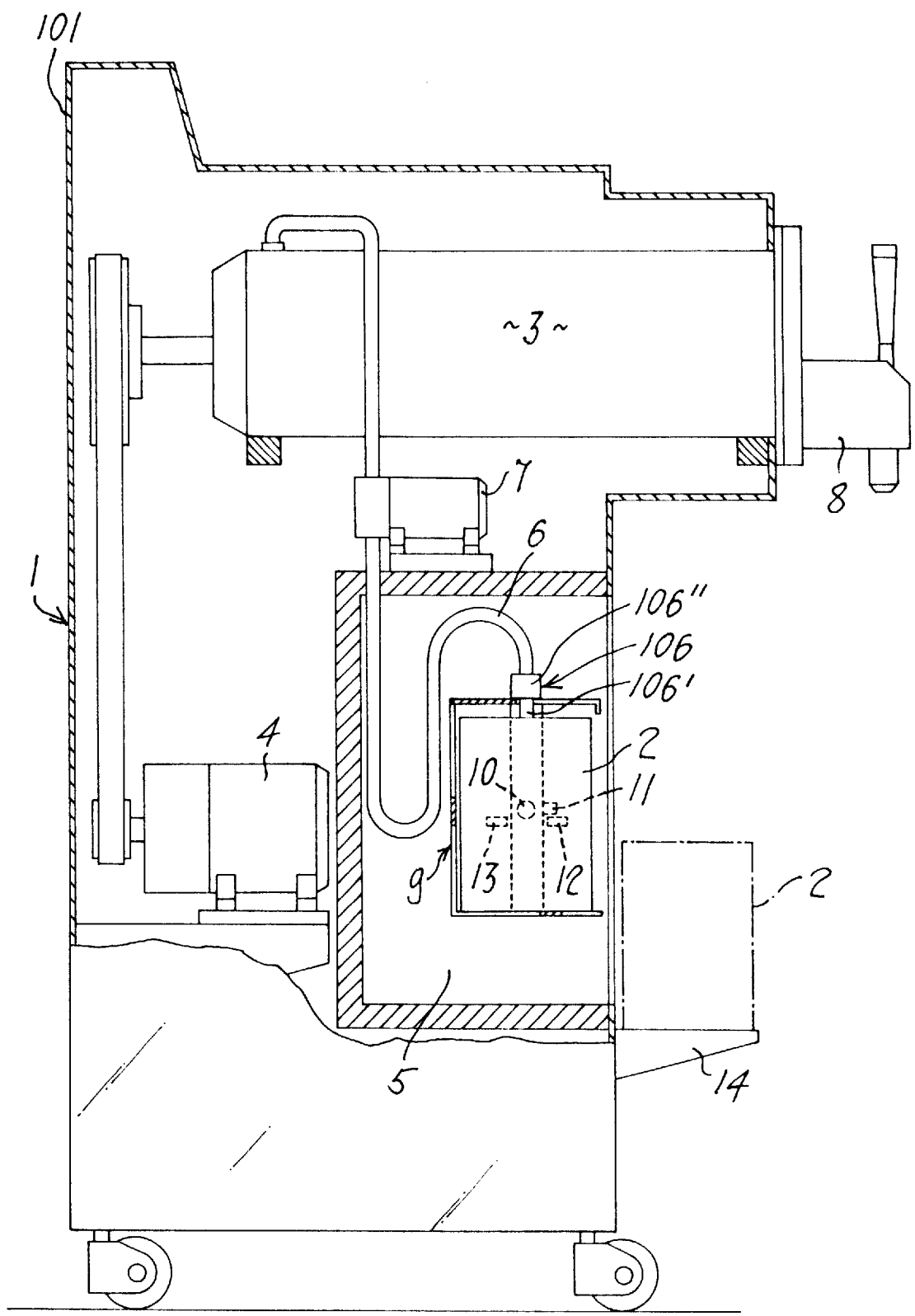
FIG. 1 is a side view in longitudinal section of an ice cream machine provided with a basket device according to the invention, illustrated in the initial position of insertion of the ice cream mix containers into the refrigerated chamber of the machine.

With reference to the drawings, and with particular reference to FIG. 1, the number 1 is a general reference for an ice cream making machine of the type in which the liquid mix is contained in special containers 2, generally formed by a protective outer case, generally made of cardboard, inside which is a plastic bag containing the liquid mix. This machine 1 comprises a housing 101 containing in its interior the freezing cylinder 3 surrounded by the evaporator (not shown) of a refrigerating system, and the drive motor 4 of the stirrer (not shown) which is inside the cylinder 3, and housing in its base the compressor and associated condenser (not shown) of the machine's refrigerating system. This machine also includes a front chamber 5 refrigerated by a section (not shown) of the evaporator of the machine's refrigerating system for taking the containers 2 of mix. This chamber is closed by a door 105. A tube 6, fitted with an engagement part 106 fitted with a spike 106' designed to be engaged in the mouth of the containers 2, is connected by a pump 7 to the admission side of the freezing chamber 3. The number 8 denotes the tap for drawing off the ice cream from the chamber 3.

In the machines currently in use, after the containers 2 have been connected up by attaching the feed tube 6 to them, they are turned upside down by hand, and in this upside-down position they are placed in the chamber 5. When a container 2 needs changing, because it has been completely emptied, or for some other reason, the container is turned the other way up again and removed from the chamber 5. All these manual operations involve the risk that the engagement part 106 may come out of the container 2, or that when the container is placed upside down on the base of the chamber 5 the engagement part may deform the container. Either way, this operation is not very easy, especially because of the weight of the full containers 2, and the fact that it is necessary to operate in a restricted space.

The present invention seeks to overcome these and other disadvantages of known machines of this type.

To this end, as illustrated in more detail in FIGS. 2 and 3 of the drawings, the invention provides a device comprising a basket 9 having the general structure of a twin cage 9' and 9", due to the fact that these machines generally have two chambers 3 side by side so that each can make one flavour of ice cream (e.g. vanilla and chocolate). This basket 9 is open at the front, with a supporting surface 109 on the underside, and a supporting surface 209 at the top. The upper surface 209 incorporates in the middle of each cage 9', 9" a deep slot 309 running in from the front of the basket 9 to about the middle of the cages 9', 9", for reasons which will be described later.

The basket 9 is provided centrally on its flanks with two coaxial holes 409, each designed to take a short journal 10 for the swivelling mounting of the basket 9 to the middle of the flanks of the chamber 5 of the machine 1, as shown more clearly in FIG. 2.

Figure 4:
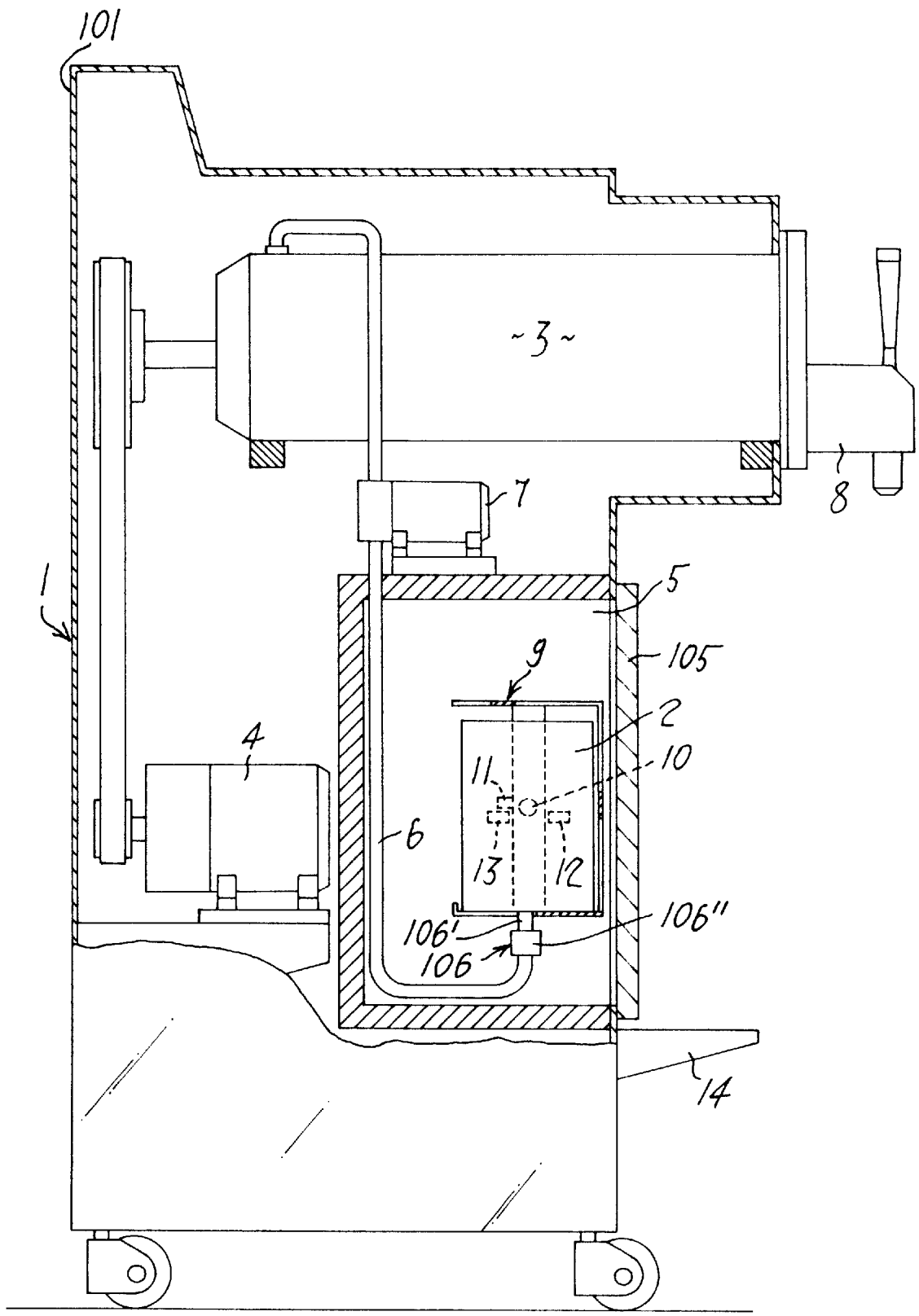
FIG. 4 is a view similar to FIG. 1, with the basket device for holding the mixed containers upside down in the working position.

The journals 10, as shown more clearly in FIGS. 1 and 4, each carry a radial arm 11 designed to be stopped by two diametrically opposite fixed stops 12 and 13, in order to limit the rotation of the basket 9 about the journals 10 to 180°, in both directions.

The machine illustrated is completed by a platform 14 projecting out from the front of the machine at approximately the height of the opening of the refrigerated chamber 5.

The operation of the device described will be obvious. Referring first of all to FIG. 1, this shows in chain line a container 2 which is initially placed on the platform 14 of the machine. This container is then transferred into one of the two adjacent compartments of the basket 9, in the position shown in FIG. 1. The part 106 located at the end of the tube 6 is then inserted by means of its male part 106' into the bag of the container 2 until its larger-diameter part 106" is against the edges of the slot 309 formed in the surface 209 of the basket 9. This ensures that the said engagement part is not pushed too far into the container 2, deforming it.

Once this coupling operation is completed, the basket 9 is rotated through 180° to the position shown in FIG. 4, which is the working position. The door 105 is closed and the machine is ready for operation.

When the baskets 2 are to be removed, because they are empty or for any other reason, the reverse procedure is followed, that is the basket 9 is rotated in the opposite direction, returning it to the position shown in FIG. 1, after which the containers 2 can be removed from the basket and replaced, if necessary, with new containers.

It will also be clear that the basket 9 can easily be mounted as an accessory in existing machines, without any particular problems, and without having to make substantial structural modifications to these machines.

The present invention is therefore not limited to the embodiment illustrated and described, but includes all those variants and modifications which come within the widest scope of the innovative concept, substantially as claimed below.

We claim:

1. In an ice cream making machine of the type in which the liquid ice cream mix is contained in special disposable containers which, after having been connected to a feeder tube equipped with an engagement part provided with a perforating spike, are turned upside down and placed in a refrigerated chamber having flanks in the body of the machine, a device for supporting and handling said containers which device comprises a basket of an essentially cage-like structure having flanks which is open at the front and provided at the bottom and top with supporting surfaces, the said cage-like structure pivoting in the centre of its flanks on the flanks of the chamber of the said machine.

2. Device according to claim 1, in which the said basket comprises a twin cage-like structure.

3. Device according to claims 1 in which the top surface of the said basket is provided in the middle of each cage with a deep slot running in from the front of said basket to approximately the middle of the cages.

4. Device according to claim 3, in which interacting stop means have been provided between the said basket and the fixed structure of the said chamber to limit to an angle of 180° the rotational movement of the said basket in both directions.

5. Device according to claim 4, in which the said engagement part comprises a male part provided at its root with a larger-diameter handle part, the diameter of the said part being such as to be stopped by the edges of the said slot formed in the top surface of the basket when the said male part is pushed downwards into the container of liquid ice cream mix.

6. Device according to claim 1, further comprising a platform which projects outwards from the front of the machine at approximately the height of the opening of the refrigerated chamber.

\* \* \* \* \*